US008683956B2

(12) United States Patent
Rafailovich (10) Patent No.: US 8,683,956 B2
(45) Date of Patent: Apr. 1, 2014

(54) AQUARIUM CLEANER

(76) Inventor: Milan Rafailovich, San Diego, CA (US)

( * ) Notice: Subject to any disclaimer, the term of this patent is extended or adjusted under 35 U.S.C. 154(b) by 28 days.

(21) Appl. No.: 13/213,968

(22) Filed: Aug. 19, 2011

(65) Prior Publication Data

US 2012/0085290 A1 Apr. 12, 2012

Related U.S. Application Data

(60) Provisional application No. 61/375,713, filed on Aug. 20, 2010.

(51) Int. Cl.
*A01K 63/04* (2006.01)

(52) U.S. Cl.
USPC ........................................................ 119/264

(58) Field of Classification Search
USPC ............. 119/264, 245, 247, 269; 210/167.21; 15/220.2
See application file for complete search history.

(56) References Cited

U.S. PATENT DOCUMENTS

| | | | | |
|---|---|---|---|---|
| 6,206,978 B1 * | 3/2001 | Tsui | | 134/8 |
| 6,348,104 B1 * | 2/2002 | Bakker | | 134/6 |
| 6,634,052 B2 * | 10/2003 | Hanson | | 15/220.2 |
| 6,865,771 B2 * | 3/2005 | Hanson | | 15/220.2 |
| 7,313,841 B2 * | 1/2008 | Huang | | 15/220.2 |
| 7,506,612 B2 * | 3/2009 | Enoch et al. | | 119/264 |
| 7,784,428 B2 * | 8/2010 | Deng | | 119/264 |
| 8,057,606 B2 * | 11/2011 | Enoch et al. | | 134/6 |
| 8,161,909 B2 * | 4/2012 | Sprung | | 119/264 |
| 2002/0112303 A1 * | 8/2002 | Hanson | | 15/220.2 |
| 2004/0031118 A1 * | 2/2004 | Hanson | | 15/220.2 |
| 2006/0048326 A1 * | 3/2006 | Huang | | 15/220.2 |
| 2006/0174840 A1 * | 8/2006 | Rafailovich | | 119/264 |
| 2007/0107665 A1 * | 5/2007 | Enoch et al. | | 119/264 |
| 2008/0105211 A1 * | 5/2008 | Deng | | 119/264 |
| 2009/0211533 A1 * | 8/2009 | Sprung | | 119/264 |
| 2010/0024739 A1 * | 2/2010 | Bakker | | 119/264 |
| 2010/0083983 A1 * | 4/2010 | Linden et al. | | 134/6 |
| 2010/0116217 A1 * | 5/2010 | Allis | | 119/264 |
| 2012/0085290 A1 * | 4/2012 | Rafailovich | | 119/264 |
| 2012/0204803 A1 * | 8/2012 | Sprung | | 119/264 |

* cited by examiner

*Primary Examiner* — Yvonne Abbott
(74) *Attorney, Agent, or Firm* — Fred C. Hernandez; Mintz Levin Cohn Ferris Glovsky and Popeo, P.C.

(57) ABSTRACT

An aquarium cleaning system has an inner member adapted to be positioned adjacent an interior surface of a sidewall of the aquarium; an outer member adapted to be positioned adjacent an exterior surface of the sidewall such that the sidewall is interposed between the inner and outer members; an attachment mechanism that retains the inner member and the outer member in a fixed position relative to one another; a cleaning member mounted on the inner member and adapted to clean the interior surface of the sidewall; and a control system adapted to cause the inner and outer member to collectively move around the side wall of the aquarium such that the cleaning member cleans the interior surface of the side wall during such movement.

16 Claims, 8 Drawing Sheets

AQUARIUM CLEANER

REFERENCE TO PRIORITY DOCUMENT

This application claims priority of co pending U.S. Provisional Patent Application Ser. No. 61/375,713 entitled "AQUARIUM CLEANER" and filed on Aug. 20, 2010. The disclosure of the Provisional Patent Application is hereby incorporated by reference in its entirety.

BACKGROUND

This disclosure relates generally to aquariums and, more particularly, to aquarium cleaning devices.

Keeping aquarium water and aquariums clean has long been and remains a major burden for people that own and maintain aquariums. Most people who maintain an aquarium have to periodically deal with the algae and other contaminants that grow over time in the aquarium. In addition to causing unsanitary conditions for the aquarium inhabitants, the algae can interfere with the visibility of the aquarium through its side walls and create a generally unattractive appearance for the aquarium.

Thus, most aquarium enthusiasts periodically clean their aquarium using an aquarium cleaning device. Conventional aquarium cleaning devices are typically hand-held devices that require a user to manually dip the device into the aquarium and manipulate the device around by hand. The user removes undesirable algae growth by physically scraping the algae off of the aquarium surfaces. It can be appreciated that such a cleaning process can be tedious, as well as unsanitary, both for the person doing the cleaning and for the inhabitants of the aquarium. Physical contact with the aquarium contents can promote disease of the aquarium's inhabitants and can also introduce contaminants onto the hands of the person doing the cleaning.

In addition to the tedious work associated with actually cleaning an aquarium, there is the additional drawback that the aquarium has to be cleaned on a regular basis. Indeed, it is not uncommon that an aquarium must be cleaned on a daily basis in order to maintain a sanitary and aesthetically-pleasing aquarium. It can be difficult and inconvenient for a person to fit aquarium cleaning into a crowded schedule. Consequently, aquariums often go uncleaned for long periods of time, which is highly undesirable.

SUMMARY

In view of the foregoing, there is a need for more convenient and reliable methods and devices for cleaning aquariums. Disclosed is an aquarium cleaning system that is configured to automatically and efficiently clean an aquarium. The cleaning system can be programmed to perform aquarium cleaning on a regular basis without requiring human intervention during the cleaning process.

In one aspect, there is disclosed an aquarium cleaning system, comprising: an inner member adapted to be positioned adjacent an interior surface of a sidewall of the aquarium; an outer member adapted to be positioned adjacent an exterior surface of the sidewall such that the sidewall is interposed between the inner and outer members; an attachment mechanism that retains the inner member and the outer member in a fixed position relative to one another; a cleaning member mounted on the inner member, wherein the cleaning member is adapted to clean the interior surface of the sidewall; and a control system adapted to cause the inner and outer member to collectively move around the side wall of the aquarium such that the cleaning member cleans the interior surface of the side wall during such movement.

In another aspect, there is disclosed a method of cleaning an aquarium, comprising: mounting an inner member and an outer member of a cleaning system on an aquarium side wall such that the aquarium side wall is interposed between the inner member and outer member; and energizing the cleaning system to cause the inner and outer members to collectively move around the side wall of the aquarium such that the inner member cleans the interior surface of the side wall during such movement.

Other features and advantages should be apparent from the following description of various embodiments, which illustrate, by way of example, the principles of the invention.

DETAILED DESCRIPTION

Before the present subject matter is further described, it is to be understood that this subject matter described herein is not limited to particular embodiments described, as such may of course vary. It is also to be understood that the terminology used herein is for the purpose of describing particular embodiments only, and is not intended to be limiting. Unless defined otherwise, all technical terms used herein have the same meaning as commonly understood by one skilled in the art to which this subject matter belongs.

Disclosed is an aquarium cleaning system that is configured to automatically and efficiently clean an aquarium. The cleaning system can be programmed to perform aquarium cleaning on a regular basis without requiring human intervention during the cleaning process. For example, the cleaning system can be programmed to clean an aquarium on specified days and at specified times so that the aquarium owner does not have to be present during cleaning. The cleaning system is configured to move along the side walls of the aquarium and clean the side walls during such movement. The specific dimensions of the aquarium can be programmed into the cleaning system so that the system operates pursuant to the specific dimensions of the aquarium. Alternately, the cleaning system is configured to navigate through an aquarium of any size such that the dimensions of the aquarium do not need to be programmed into the system. Thus, it is not necessary that the system be programmable, as the system can determine on its own a proper pathway for navigating along the aquarium side wall. The system can also be configured to detect a level of cleanliness in the water such that the system automatically begins to clean the aquarium when a predetermined threshold is achieved.

It should be appreciated that the cleaning system can be configured to clean surfaces other than aquarium surfaces. For example, the cleaning system can be adapted for use in cleaning windows on a structure, such as on a building. Accordingly, the system is not limited to use as an aquarium cleaner, but can be configured for use in cleaning a variety of planar surfaces.

Figure 1:
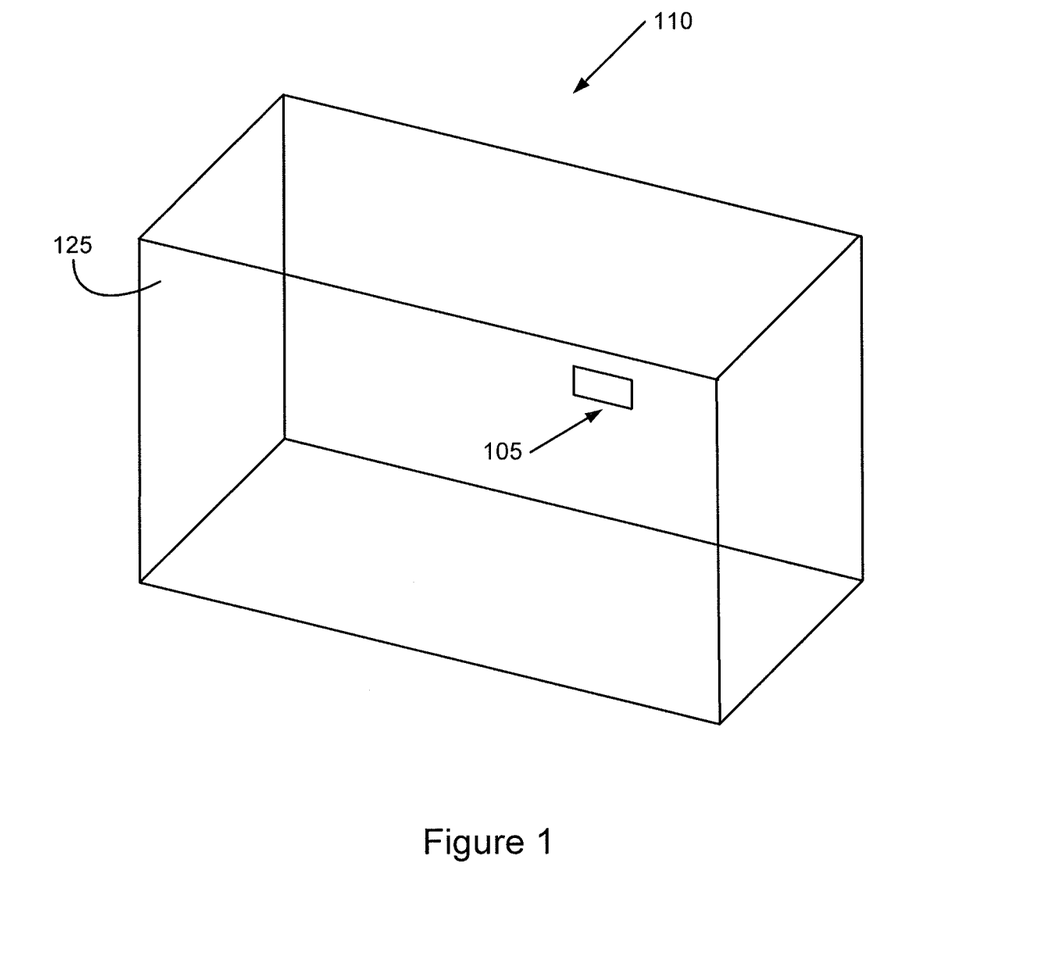
FIG. 1 shows a perspective view of an aquarium cleaning system that is configured for cleaning the interior surfaces of an aquarium.
Figure 2A:
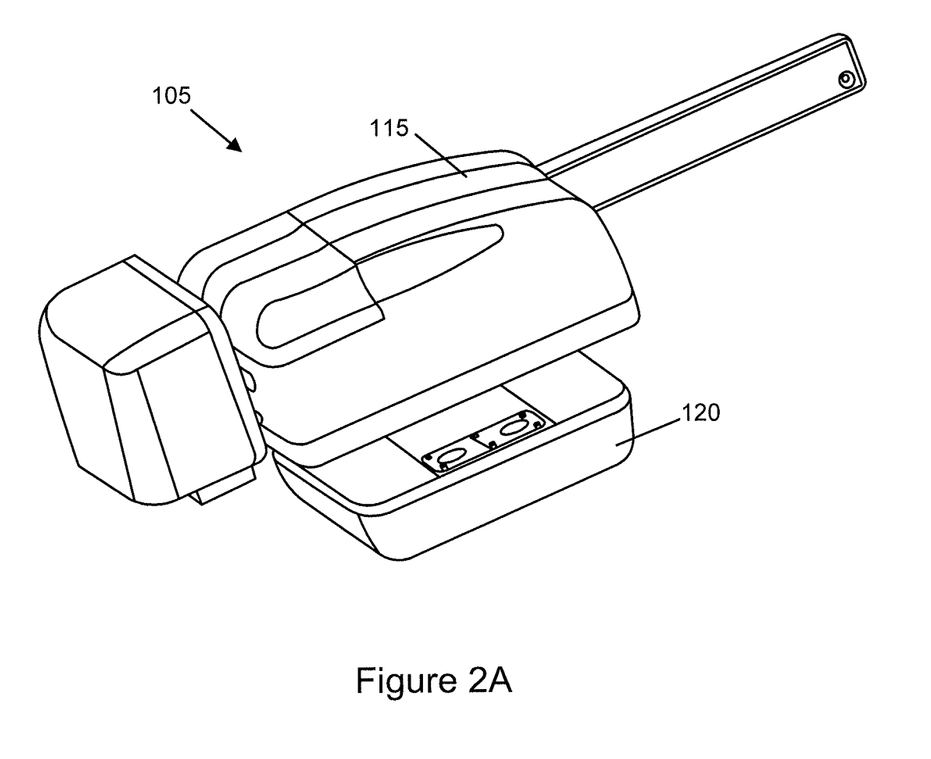
FIG. 2A shows a perspective view of an embodiment of the cleaning system 105.
Figure 2B:
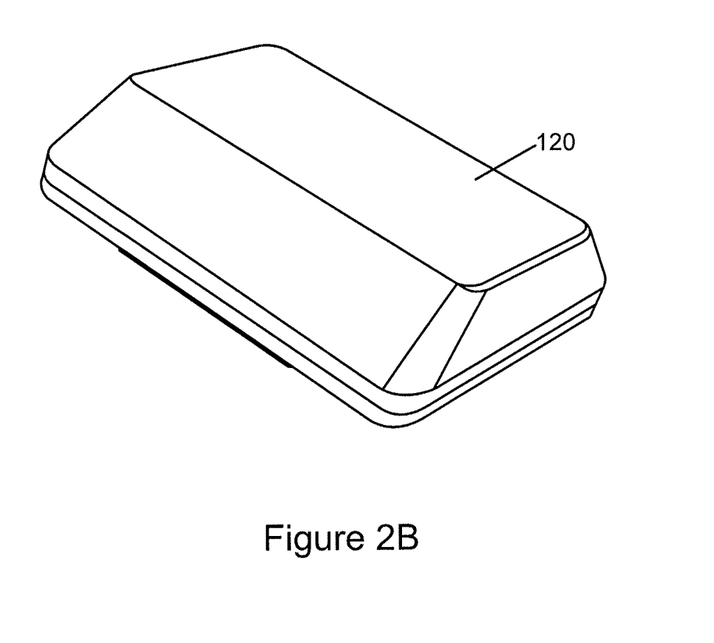
FIG. 2B shows a first, perspective view of an exemplary embodiment of a component of the cleaning system.
Figure 2C:
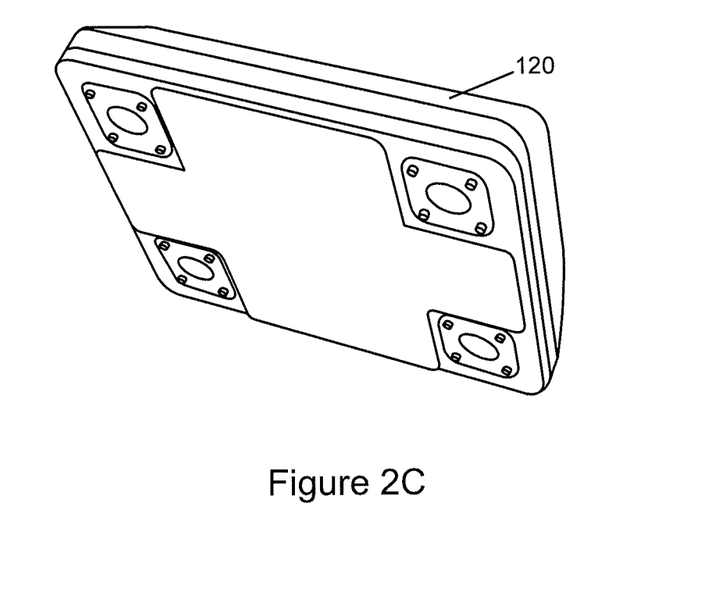
FIG. 2C shows a second, perspective view of an exemplary embodiment of a component of the cleaning system.
Figure 2D:
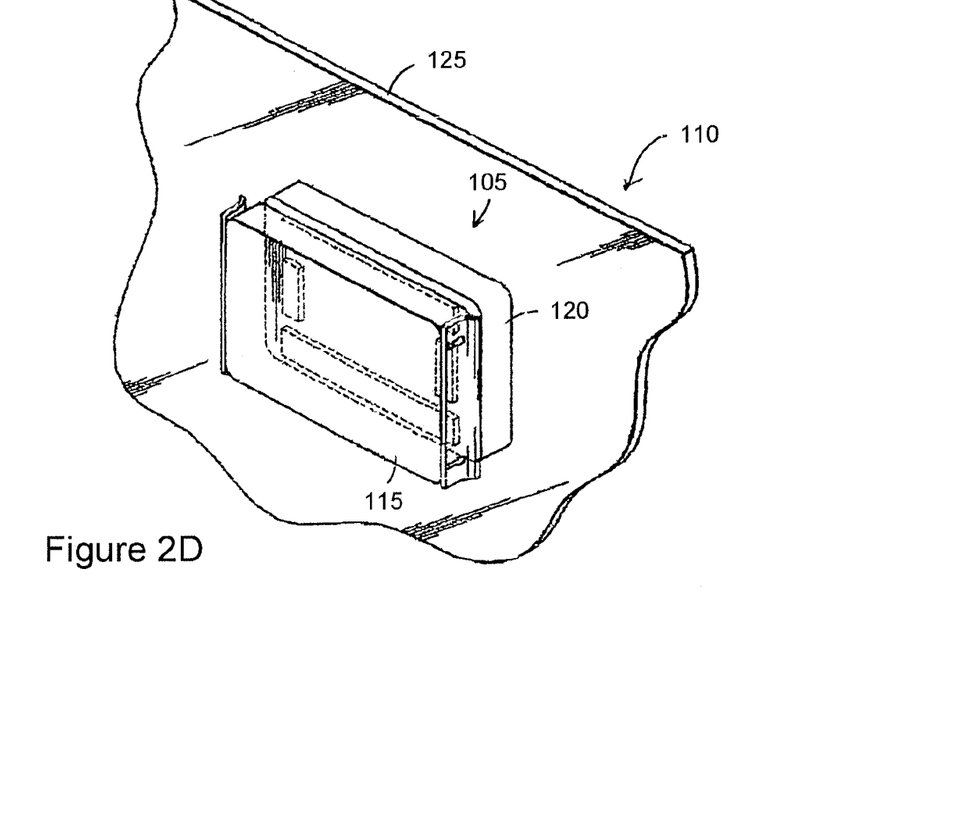
FIG. 2D shows an enlarged view of the cleaning system mounted on a wall of the aquarium.

FIG. 1 shows a perspective view of an exemplary embodiment of an aquarium cleaning system 105 that is configured for cleaning the interior surfaces of an aquarium 110. The cleaning system 105 is represented schematically in FIG. 1. FIG. 2A shows a perspective view of an embodiment of the cleaning system 105. FIG. 2B shows first, perspective view of an exemplary embodiment of a component of the cleaning system. FIG. 2C shows a second, perspective view of an exemplary embodiment of a component of the cleaning system. FIG. 2D shows an enlarged view of an exemplary embodiment of the cleaning system 105 mounted on a wall of the aquarium 110. The aquarium is a container, such as a glass tank, that typically contains water for housing of aquatic creatures, including animals or plants. The aquarium generally includes planar side walls that can be formed of a transparent material (such as glass). The aquarium 110 is shown in F*ig*. 1 as having an exemplary rectangular shaple, although it should be appreciated that the shape of the aquarium can vary.

Figure 3:
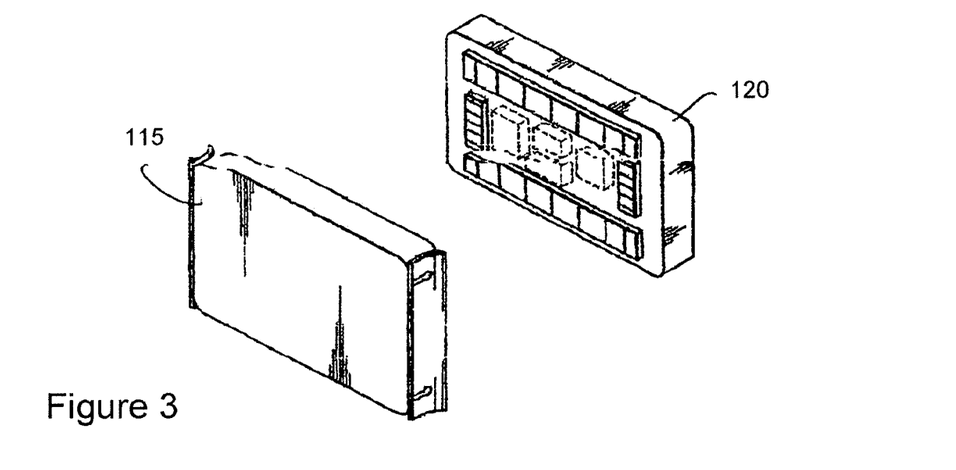
FIG. 3 shows a perspective view of the cleaning system in an unassembled state.

FIG. 3 shows a perspective view of an embodiment of the cleaning system 105 in an unassembled state. With reference to FIGS. 2A-3, the cleaning system 105 includes an outer member 115 that is removably coupled to an inner member 120 with a side wall 125 (shown in phantom lines in FIG. 2 for clarity of illustration) of the aquarium interposed therebetween. An attachment means, such as magnetic force, is used to retain the outer member 115 and the inner member 120 coupled to one another, as described in detail below. The outer member 115 and inner member 120 are configured to collectively move around the side walls of the aquarium 110 and clean the interior and/or exterior surfaces of the side walls during such movement. Advantageously, the cleaning system 105 performs its cleaning functions without the need of human assistance.

In an embodiment, a leading edge (with respect to the direction of travel of the cleaning system 105) of the inner member 120 includes a sweeper member 127 (FIG. 4) that is configured to gently sweep aside any debris that is positioned along the pathway of the cleaning system. The debris may be a live organism, such as a snail, so it is preferred that the sweeper member be oriented an angle relative to the aquarium surface such that the sweeper member bluntly or gently pushes the debris away without damaging the debris. The sweeper member may be configured such that it peels away any debris from the surface of the aquarium as the cleaning system 105 moves along its pathway. In this regard, the sweeper member may have a thin front edge that is configured not to cause damage to debris in the pathway while still being configured to remove the debris from the pathway. In another embodiment, the front edge of the sweeper member is blunt.

Figure 4:
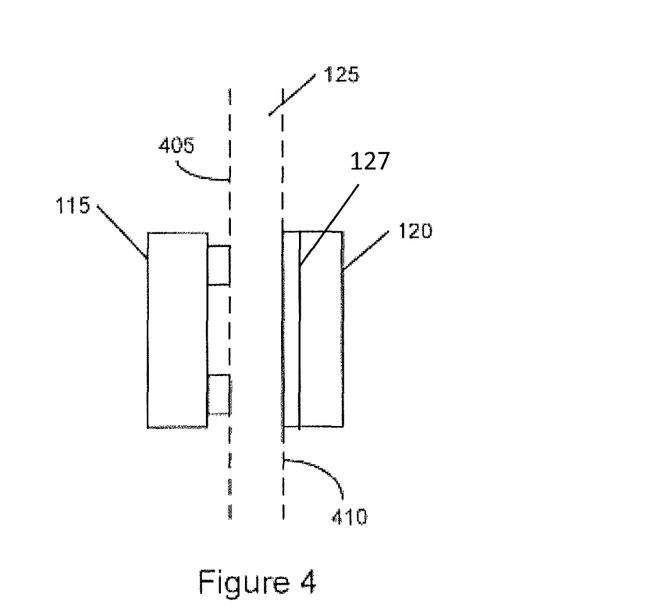
FIG. 4 is a schematic, cross-sectional view of the cleaning system mounted on a side wall of the aquarium.

FIG. 4 is a schematic, cross-sectional view of the cleaning system 105 mounted on a side wall 125 of the aquarium. The outer member 115 is positioned adjacent an exterior surface 405 of the side wall 125 while the inner member 120 is positioned adjacent an interior surface 410 of the side wall 125. As mentioned, an attachment means, such as a magnetic force, is used to retain the inner member 120 and outer member 120 in a fixed position relative to one another. In this regard, the inner and outer members can be equipped with magnets and/or magnetically attractive materials that implement the magnetic coupling of the inner and outer members.

As mentioned, the inner member 120 and outer member 115 are configured to collectively move or travel along the side walls of the aquarium 110 and clean the side wall during such movement. The magnetic force (or other attractive force) is desirably sufficiently strong to retain the inner and outer members in a fixed relationship relative to one another during such movement, but still permit the inner and outer members to slide along the wall. Moreover, it should be appreciated that the interior of the aquarium holds water such that the inner member 120 can be completely or partially submerged within the water. In this regard, the inner member 120 is manufactured of or includes water-proof or water resistant materials that prevent or inhibit damage of the inner member 120 due to water exposure.

Figure 5:
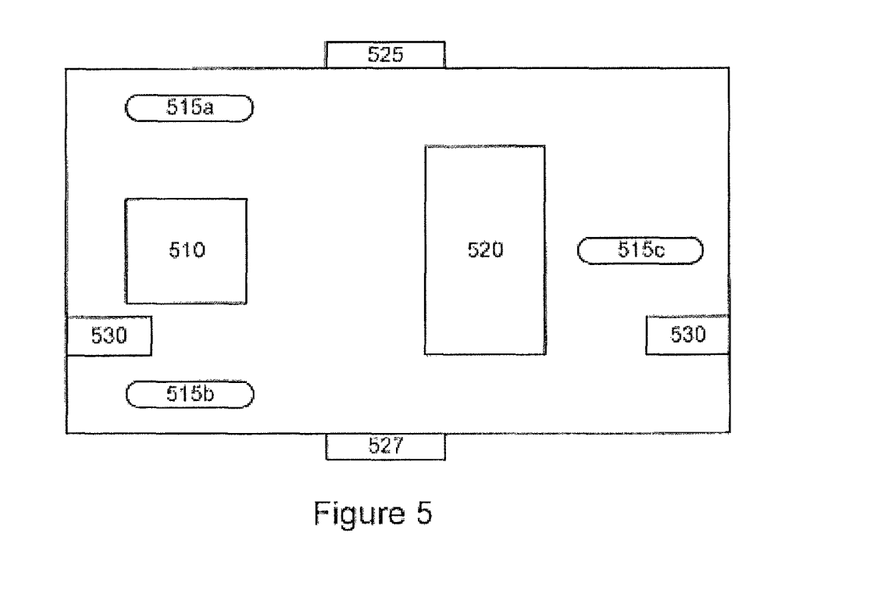
FIG. 5 shows a schematic, plan view of the outer member of the cleaning system.

FIG. 5 shows a schematic, plan view of the outer member 115 of the cleaning system 105. In one embodiment, the outer member 115 is a control portion of the system 105 in that the outer member includes electronic and/or mechanical equipment that control movement of the cleaning system 105 along the side walls of the aquarium. The outer member 115 includes one or more electronic components 505 configured to interact with a drive motor 510 and one or more navigational components that enable the cleaning system 105 to move about the aquarium during cleaning, as described in detail below. The outer member 115 can include control software and/or electronic equipment that enable the outer member to control the movement of the cleaning system 105 over the walls of the aquarium.

Figure 8:
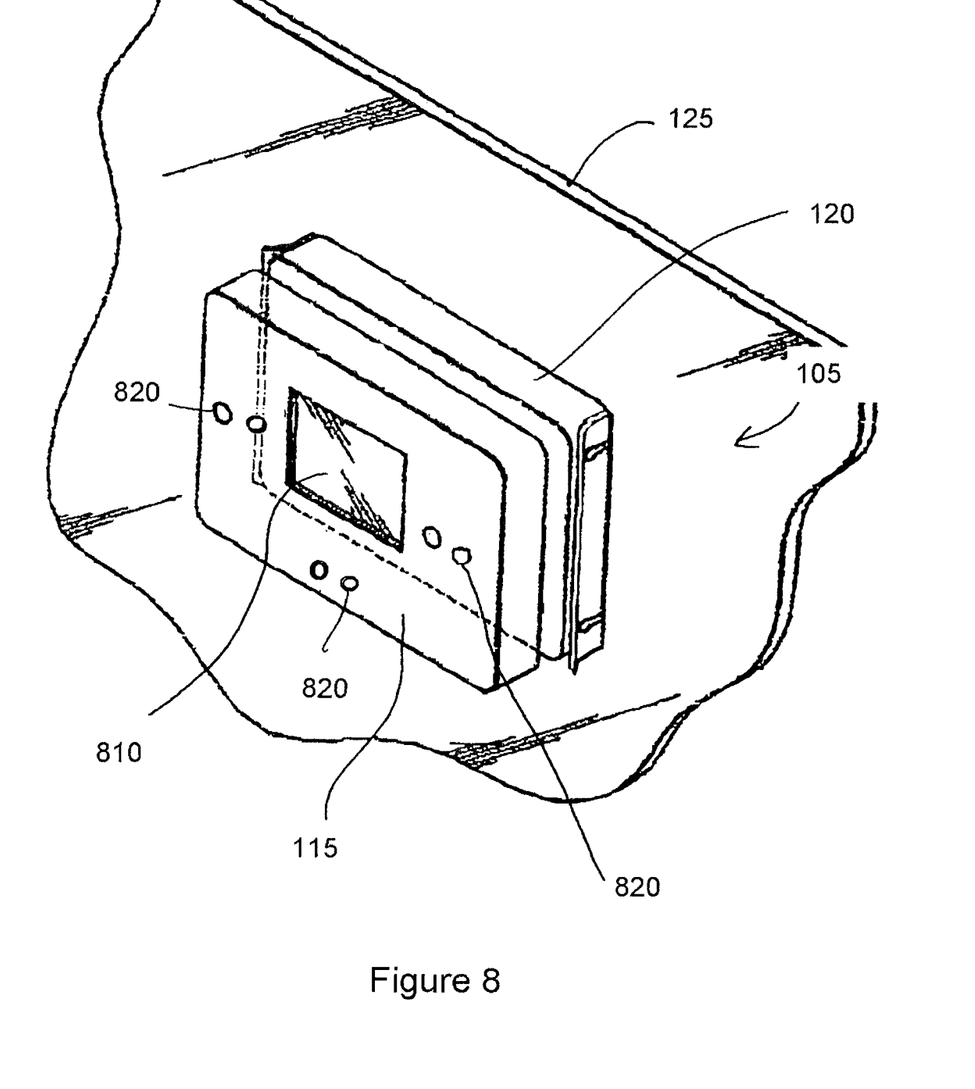
FIG. 8 is a perspective view of an exemplary embodiment of a cleaning system.

The electronic components can be programmable such that a human operator can program the cleaning system 105 to clean the aquarium on specified days at specified times without the person being present. The cleaning system 105 can include display means on an outside surface (such as on the outer member) that display the settings. In addition, the dimensions of the aquarium can be programmed such that the cleaning system will clean along a predetermined length and depth. The electronic components can be encased in a water proof housing to protect them from water. FIG. 8 shows a perspective view of an exemplary cleaning system 105 having display means 810 and control inputs 820 for programming the cleaning system.

With reference still to FIG. 5, the drive motor 510 is coupled to one or more movement members, such as wheels 515. The wheels are referred to individually using the reference numeral 515 combined with a letter suffice (e.g., 515*a*, 515*b*, and 515*c*) and collectively using the reference numeral 515. In the illustrated embodiment, the cleaning system 105 includes three wheels 515*a*, 515*b*, and 515*c* with the wheels 515*a* and 515*b* being positioned on opposed sides of the outer member 115 and the wheel 515*c* being positioned at a front end of the outer member 115. It should be appreciated, however, that the cleaning system 105 can include any quantity of wheels that are arranged in various spatial relationships on the cleaning system. In another embodiment, wheels are located on the inner member rather than the outer member or are located on both the inner member and outer member.

The wheels 515 are desirably manufactured of a material that is configured to easily move along the side walls of the aquarium while maintaining traction with the side walls. It should be appreciated that the cleaning system is not limited to use with wheels, as other transport mechanisms can be used. In an embodiment, the wheels comprise tires manufactured of a high friction material that is configured to maintain the wheels in contact with the surface of the tank. The material desirably has sufficient friction to prevent slippage of the wheels on the surface of the tank.

In an embodiment, at least one of the inner or outer members includes spherical members as the means of contacting the surface of the aquarium. For example, as shown in FIG. 2C, each of the four corners of the inner or outer component includes contact members comprised of bearings 517 that are used to contact the surface of the aquarium. The spherical nature of the bearings permits the contact members to conform to variations in thickness and/or surface contour of the aquarium. In this manner, the cleaning system automatically compensates and rides smoothly over variations in thickness or contour of the aquarium walls.

As mentioned, the drive motor 510 is mechanically and/or electronically coupled to the wheels 515. In this regard, the drive motor 510 can be energized to cause the wheels 515 to rotate in a desired direction to cause the cleaning system 105 to move along the side walls of the aquarium. It should be appreciated that both wheels 515 do not necessarily rotate in the same direction during such movement. Each wheel 515 can be independently rotated in a desired direction in order to impart a desired movement to the cleaning system 105. For example, the wheel 515a can rotate in a first direction while the wheel 515b rotates in the opposite direction to cause the cleaning system to turn along a desired path. In this manner, the cleaning system 105 can travel along a pathway that covers all or a portion of the sidewalls of the aquarium, as described in more detail below.

In an embodiment, the cleaning system 105 includes a gravity-sensor that functions to determine the orientation or changes in orientation of the cleaning system. The sensor is coupled to the control system, such as in a feedback arrangement. For example, the senor may be a tilt sensor that sends a signal to the control system when the cleaning system tilts away from a predetermined orientation. When a tilting is detected, the control system may adjust power to one or more of the wheels to re-orient the cleaning system back to the desired orientation. In an embodiment, the sensor is configured to detect a 1 degree change in orientation from an initial orientation. In this manner, the control system can maintain proper path alignment of the cleaning system 105 as it moves through the tank.

The front wheel 515c is mechanically coupled to a control means such as a solenoid that can be energized to cause the front wheel to change its orientation along a predetermined range of angles. In this manner, the front wheel 515c can be re-oriented or steered to direct the cleaning system along a desired pathway.

With reference still to FIG. 5, the outer member 115 includes a set of navigational guides that the cleaning system 105 uses to navigate as it travels along the side walls of the aquarium 110. Such navigation permits the cleaning system 105 to move along the side walls in a predetermined and controlled manner, as described in detail below. The navigational guides include one or more upper limit switches 525 that are located at or near an upper end of the outer member 115. The upper limit switches 525 are configured to detect when the cleaning system 105 is positioned at or near the upper edge of a side wall of the aquarium. The navigational system of the outer member 115 also includes one or more lower switches 527 that are located at the lower end of the outer member 115. The lower switches are configured to detect when the cleaning system 105 is positioned at or near a lower edge of the side wall, such as near the bottom of the aquarium.

The outer member 115 also includes a pair of wall sensor switches 530 on opposed sides of the outer member 115. The wall sensor switches 530 can detect when the cleaning system 105 is at or near an adjacent wall of the aquarium, such as at a corner of the aquarium. In an embodiment, the device is configured to automatically start seeking the location of a charging base for charging the device. In this regard, device can be coupled to a charging station that automatically charges the device as needed. Using the navigational system, the cleaning system 105 can navigate along the side walls and along the corners to enable the cleaning system 105 to clean the aquarium without human intervention.

The inner member can also include navigational or sensor capabilities. For example, the inner member can include components, such as one or more switches, that detect the presence of obstructions within the pathway of the cleaning system. The components can detect obstructions, such as sand, gravel, equipment, marine life, etc, that can interfere with movement of the cleaning system. Upon encountering such obstructions, the cleaning system can adjust its movement to navigate around the obstructions. The sensors can be located on the inner member or the outer member.

In one embodiment, a navigation component is located at a bottom edge of the inner member. The navigation component is at least one downward extending rod or other structure that hangs or is otherwise freely suspended from the inner member in a pendulum fashion. Thus, the rod is configured to swing to one side when it encounters an object positioned below the inner member. The outer member includes a corresponding detection component that is configured to detect the position of the hanging rod. For example, the detection component can detect when the rod is hanging completely downward and can also detect when the rod has swung to one side. When the inner member moves downward and encounters an obstruction (such as the bottom surface of the aquarium or some other obstruction) the bottom tip of the rod abuts the obstruction, which cause the rod to swing to one side. The detection component on the outer member then detects that the rod has swung out of its default position, which means that the cleaning system has encountered an obstruction beneath the inner member. In response, the control portion causes the cleaning system to adjust its movement to navigate around the obstruction. For example, if the obstruction is the bottom surface of the aquarium or gravel on the bottom surface, then the movement of the cleaning system can be adjusted to cease downward movement and rather travel horizontally across the bottom of the aquarium.

Figure 6A:
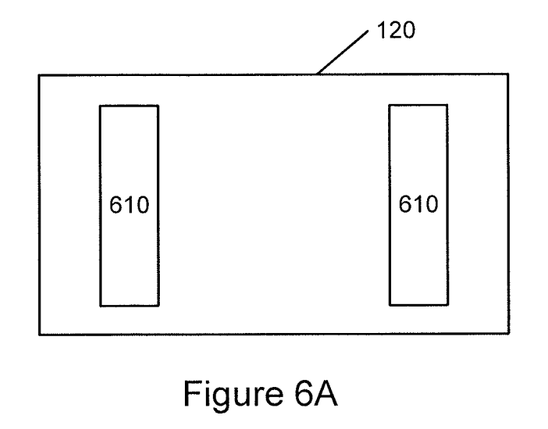
FIG. 6A shows a plan top view of the inner member of the cleaning system.
Figure 6B:
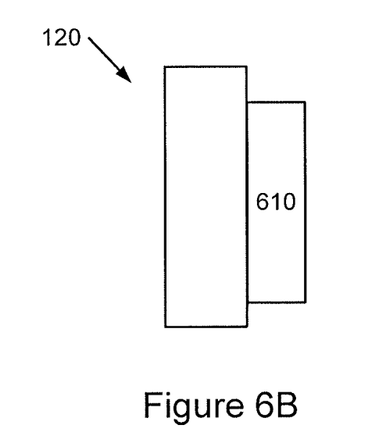
FIG. 6B shows a side view of the inner member.

FIG. 6A shows a plan top view of the inner member 120 and FIG. 6B shows a side view of the inner member 120. As mentioned, the inner member 120 includes a magnet or magnetically-attractive material that interfaces with similar component on the outer member 115. This permits the inner and outer members to stay in a fixed position relative to one another as the cleaning system 105 moves along the side walls of the aquarium 110.

The inner member 120 includes one or more cleaning members 610 that are positioned on the surface of the inner member 120 that faces the interior surface 410 (FIG. 4) of the sidewall 125. The cleaning member 610 comprises a material that can scrub or otherwise clean the side wall 125 as the cleaning member 105 moves along the side wall. The cleaning member 610 can be an abrasive material or a soft material, as long as the cleaning member 610 provides some cleaning of the side wall 125 as the cleaning member 610 slides along the side wall 125. The cleaning member(s) can be coupled to the inner member using a ball and socket type coupling arrangement. This permits the cleaning member to move freely relative to the inner member in any direction and orientation and thereby compensate for variations in the contour of the surface of the tank.

The cleaning member 610 can have various configurations. For example, the cleaning member can be elongated pad or it can be a blade having edges that scrape along the surface of the sidewall to clean the sidewall. The cleaning member 610 can be removable and can be manufactured of any of a variety of materials, such as VELCRO, an abrasive material, a sponge, etc. The cleaning member 610 could also be coated or otherwise equipped with cleaning materials. If the system is used for cleaning an aquarium, then the cleaning materials should be suited for use in an aquatic environment such that they are not harmful to any marine life. If the system is used in a different environment, such as to clean windows, then the cleaning materials can comprise a cleaning substance such as soap or detergent. The cleaning substance is desirably suited for the particular environment where the system is used. It should be appreciated that the inner member 610 can include any number of cleaning members having various shapes and sizes and positioned in various spatial arrangements.

The cleaning system 105 is coupled to a source of energy for powering the motor 510 and for energizing the electronic components. In this regard, a battery can be located on the inner or outer member. Alternately, a power cord can be attached to the cleaning system (such as to the outer member) for providing electrical energy to the cleaning system 105.

The inner member 120 can also be configured to float in water or other liquid. This enables the inner member 120 to float to the top of the water surface rather than sink should the inner member 120 become detached from the outer member 115 during use. The floatation of the inner member 120 can be achieved in various manners. For example, the inner member 120 can be at least partially manufactured of a material that floats. Alternately, the inner member 120 can be equipped with a floatation device that floats.

The operation of the cleaning system 105 is now described. The inner and outer members are first attached to the aquarium 110 in the manner shown in FIG. 1. As mentioned, the inner member 120 is positioned adjacent the interior surface 410 of the side wall 125 and the outer member 115 is positioned adjacent the outer surface 405, as shown in FIG. 4. The magnetic attraction or some other attachment means between the inner and outer members keeps the two members in a fixed position relative to one another.

The electronic components of the outer member 120 are then energized such as via an alternating or direct current energy source. The outer member 120 functions as a control device that controls the movement of the cleaning system 105 over the side walls of the aquarium. The electronic components are programmed to cause the cleaning member to travel along the sidewall in a predetermined manner such that the cleaning members 610 on the inner member scrape against or otherwise clean the side wall as the cleaning system travels. The outer member can include a soft surface that abuts the sidewall so that the outside surface of the sidewall is not scratched or blemished during movement of the cleaning member. The cleaning member itself can also be sufficiently soft so as not to scratch the surface, but sufficiently abrasive to clean the surface.

The driver motor 510 is powered to cause the wheels 515 to rotate, which causes the outer member 115 to move along the sidewall 125. The magnetic attraction between the inner and outer members causes the inner member to move with the outer member as the wheels rotate. The cleaning members 610 scrape against the interior surface 410 of the sidewall and thereby clean the interior surface. The cleaning system desirably follows a pathway such that it covers the entire surface area of the sidewall to clean the entire sidewall.

Figure 7:
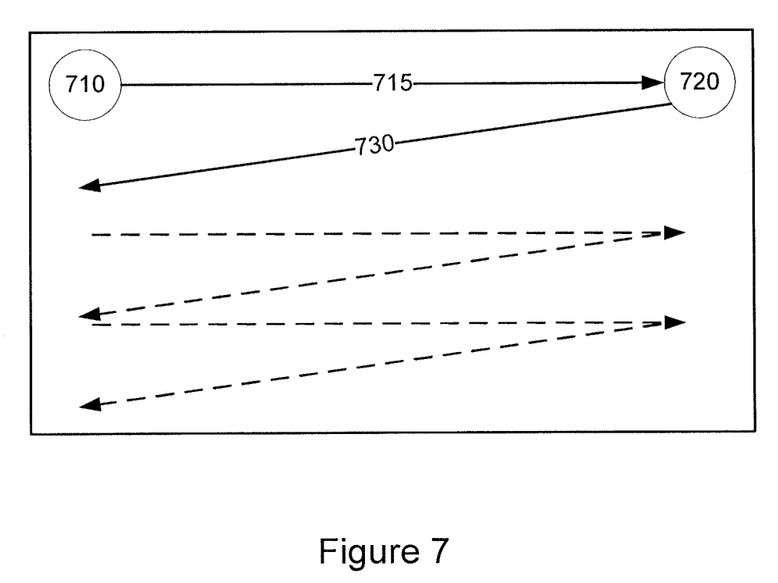
FIG. 7 is a side view of a side wall of the aquarium showing an exemplary path that the cleaning member follows during cleaning.

In one embodiment, the cleaning system travels in a back-and-forth pattern over the side wall. FIG. 7 is a side view of a side wall 125 of the aquarium showing an exemplary path that the cleaning member follows during cleaning. At the start of the cleaning process, the cleaning member 105 is initially positioned in an upper corner of the side wall 125, as represented by reference numeral 710. The cleaning member then travels horizontally (as represented by line 715 in FIG. 7) toward the opposite corner 720 of the sidewall 125. The cleaning system then moves downward and across the sidewall in the opposite direction, as represented by the arrow 730 in FIG. 7. This continues until the cleaning system reaches the bottom of the aquarium, as represented by phantom lines in FIG. 7. The movement along the opposite direction can be diagonal such that the cleaning system 105 simultaneously moves downwardly and horizontally in a "zig-zag" pattern. In another movement scheme, the movement can alternate between horizontal and downward movement in a step fashion across the sidewall. In this manner, the cleaning system 105 travels over the sidewall to clean the entire sidewall. When the cleaning member reaches the bottom of the sidewall, it can move back upward in a continuous cleaning cycle.

The control system is configured to interact with the gravity sensor to ensure that the cleaning system follows a proper pathway and does not deviate from the pathway. In this regard, the control system may include a compensation factor that compensates for deviations in the pathway such as a result of the weight of the cleaning system 105. For example, the weight of the cleaning system may be such that the pathway has a tendency to dip downward as the cleaning system 105 moves along the pathway. Without any compensation, the pathway would continuously creep downward such that the cleaning system 105 will not reach the top of the tank. The control system may compensate for such creep by causing the pathway to ascend by a predetermined factor, such as about 3 degrees. The weight of the cleaning system essentially counteracts the 3 degree compensation factor such that the net result is that the pathway is essentially horizontal rather than creeping downward (as a result of the weight of the control system) or creeping upward (as a result of the control system compensation).

As mentioned, the cleaning member includes navigational aides that assist the cleaning member in navigating over the sidewall. The navigation aides can be on the inner member, outer member, or on both the inner and outer members. The top limit switches 525 detect when the cleaning system 105 has reached the upper edge of the sidewall during upward movement. The top limit switches 525 are actuated when the upper edge is reached so that the control system adjusts movement accordingly and prevents the cleaning system 105 from moving past the upper edge. Likewise, the wall sensors 530 detect when the cleaning system reaches the corners of the sidewall and the bottom switch 527 detects when the cleaning system reaches the bottom edge of the sidewall.

In an embodiment, the control system includes a wireless component that is configured to communicate wirelessly with a corresponding wireless component outside of the tank. The wireless communication can be configured according to any of a variety of wireless protocols, including Bluetooth. The wireless component outside the tank can be configured to communicate with a telecommunication network including a cellular network, the Internet, etc. The inner member may include a camera that can record video and other images. The images and video can be transmitted wirelessly to the wireless component outside the tank, which can then transmit or upload the images to the network. In addition, the wireless component of the control system can transmit data and receive data wirelessly to and from the outside wireless component.

While this specification contains many specifics, these should not be construed as limitations on the scope of an invention that is claimed or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Although embodiments of various methods and devices are described herein in detail with reference to certain versions, it should be appreciated that other versions, embodiments, methods of use, and combinations thereof are also possible. Therefore the spirit and scope of the appended claims should not be limited to the description of the embodiments contained herein.

What is claimed is:

1. An aquarium cleaning system, comprising:
   an inner member adapted to be positioned adjacent to an interior surface of a sidewall of the aquarium, wherein a leading edge of the inner member includes a sweeper member configured to sweep away debris positioned along a pathway of the cleaning system;
   an outer member adapted to be positioned adjacent to an exterior surface of the sidewall such that the sidewall is interposed between the inner and outer members;
   an attachment mechanism that retains the inner member and the outer member in a fixed position relative to one another;
   a cleaning member mounted on the inner member, wherein the cleaning member is adapted to clean the interior surface of the sidewall;
   a control system adapted to cause the inner and outer member to collectively move around the side wall of the aquarium such that the cleaning member cleans the interior surface of the side wall during such movement; and
   at least one navigational member that assists the cleaning system in navigating along the side wall.

2. A system as in claim 1, wherein the sweeper member has a sharp leading edge.

3. A system as in claim 1, wherein the sweeper member has a blunt leading edge.

4. A system as in claim 1, wherein the sweeper member is oriented at a predetermined angle relative to a pathway direction of the sweeper member.

5. A system as in claim 1, wherein the outer member includes at least one wheel that enables the outer member to move along the sidewall.

6. A system as in claim 1, wherein the control system includes a drive motor coupled to at least one wheel, wherein the drive motor is energized to cause the wheel to rotate and move the inner and outer members along the side wall.

7. A system as in claim 1, wherein the control system includes means for programming an operating schedule for the cleaning system, wherein the operating schedule specifies at least one date and time in which the cleaning system should clean the aquarium.

8. A system as in claim 1, wherein the navigational member includes an upper limit switch mounted on an upper edge of the outer member, wherein the upper limit switch is configured to detect when the cleaning system is positioned at or near an upper edge of a side wall of the aquarium.

9. A system as in claim 1, wherein the navigational member includes an lower limit switch mounted on an lower edge of the outer member, wherein the lower limit switch is configured to detect when the cleaning system is positioned at or near a lower edge of a side wall of the aquarium.

10. A system as in claim 1, wherein the navigational member includes an corner switch mounted on a side edge of the outer member, wherein the corner switch is configured to detect when the cleaning system is positioned at or near a corner of a side wall of the aquarium.

11. A system as in claim 1, wherein the navigational member is located on the inner member and wherein the navigational member is adapted to detect the presence of an obstruction in a movement path of the cleaning system.

12. A system as in claim 1, wherein the cleaning member is removably attached to the inner member.

13. A system as in claim 1, wherein the cleaning member comprises a pad.

14. A system as in claim 1, wherein the cleaning member comprises a blade.

15. A system as in claim 1, wherein multiple cleaning members are mounted on the inner member.

16. A system as in claim 1, wherein the attachment mechanism uses a magnetic force to retain the inner member and the outer member in a fixed position relative to one another.

* * * * *